(12) United States Patent
You et al.

(10) Patent No.: US 11,856,349 B2
(45) Date of Patent: Dec. 26, 2023

(54) MOBILE TERMINAL

(71) Applicant: VIVO MOBILE COMMUNICATION CO., LTD., Guangdong (CN)

(72) Inventors: Liwen You, Guangdong (CN); Junhui Chen, Guangdong (CN)

(73) Assignee: Vivo Mobile Communication Co., LTD., Guangdong (CN)

( * ) Notice: Subject to any disclaimer, the term of this patent is extended or adjusted under 35 U.S.C. 154(b) by 104 days.

(21) Appl. No.: 17/547,026

(22) Filed: Dec. 9, 2021

(65) Prior Publication Data

US 2022/0103920 A1 Mar. 31, 2022

Related U.S. Application Data

(63) Continuation of application No. PCT/CN2020/095547, filed on Jun. 11, 2020.

(30) Foreign Application Priority Data

Jun. 26, 2019 (CN) .......................... 201910561653.X

(51) Int. Cl.
*H04R 1/02* (2006.01)
*H04M 1/02* (2006.01)

(52) U.S. Cl.
CPC ............. *H04R 1/028* (2013.01); *H04M 1/026* (2013.01); *H04R 2499/11* (2013.01); *H04R 2499/15* (2013.01)

(58) Field of Classification Search
CPC ........................... H04R 1/028; H04R 2499/11; H04R 2499/15; H04R 2420/07; H04R 1/023;

(Continued)

(56) References Cited

U.S. PATENT DOCUMENTS 9,660,684 B2   5/2017 Rayner
2009/0247244 A1  10/2009 Mittleman et al.
(Continued)

FOREIGN PATENT DOCUMENTS

CN   107613073 A   1/2018
CN   107682486 A   2/2018
(Continued)

OTHER PUBLICATIONS

International Search Report and Written Opinion of International Application No. PCT/CN2020/095547 dated Sep. 15, 2020.
(Continued)

*Primary Examiner* — Tuan D Nguyen
(74) *Attorney, Agent, or Firm* — IP & T GROUP LLP

(57) ABSTRACT

A mobile terminal includes a first terminal portion disposed with a first sound output hole and a second terminal portion disposed with a second sound output hole and a receiver. The second terminal portion can move between a first position and a second position relative to the first terminal portion. At the first position, the first sound output hole is connected to the second sound output hole, and at the second position, the second sound output hole is staggered from the first terminal portion. A baffle is disposed on the second terminal portion. The second terminal portion is located at the second position relative to the first terminal portion, and the baffle covers the second sound output hole. The second terminal portion is located at the first position relative to the first terminal portion, the baffle is removed away from the second sound output hole.

18 Claims, 3 Drawing Sheets

(58) Field of Classification Search
CPC ... H04R 11/06; H04R 2400/03; H04M 1/026; H04M 1/03
See application file for complete search history.

(56) References Cited

U.S. PATENT DOCUMENTS

2010/0202650 A1* 8/2010 Park .................. H04M 1/03
  381/387
2016/0249123 A1* 8/2016 Lee .................. H04R 1/086

FOREIGN PATENT DOCUMENTS

| | | |
|---|---|---|
| CN | 107968866 A | 4/2018 |
| CN | 207427250 U | 5/2018 |
| CN | 207588947 U | 7/2018 |
| CN | 207968568 U | 10/2018 |
| CN | 207968571 U | 10/2018 |
| CN | 208158648 U | 11/2018 |
| CN | 109302514 A | 2/2019 |
| CN | 208849809 U | 5/2019 |
| CN | 110312022 A | 10/2019 |
| EP | 3471439 A1 | 4/2019 |

OTHER PUBLICATIONS

First Office Action of Priority Application No. 201910561653.X dated Jun. 3, 2020.

* cited by examiner

MOBILE TERMINAL

CROSS-REFERENCE TO RELATED APPLICATIONS

This application is a Bypass Continuation Application of PCT/CN2020/095547 filed on Jun. 11, 2020, which claims priority to Chinese Patent Application No. 201910561653.X filed on Jun. 26, 2019, which are incorporated herein by reference in their entirety.

TECHNICAL FIELD

The present disclosure relates to the field of communications technologies, and in particular, to a mobile terminal.

BACKGROUND

At present, there are a great deal of machines on the market, and receiver designs of various models are also unique. To achieve a full-screen design without a bang, currently, a sliding cover or a rising and falling manner is generally used to hide a front-facing camera, and a receiver is also hidden under a screen. Sound can be played through two layers of sound output holes. In other words, a voice call may be normally made without sliding the sliding cover out or lifting the receiver. To use the front-facing camera normally, the sliding cover needs to be slid out, or the camera needs to be lifted.

This type of front-facing camera designed with raising and falling/sliding cover causes the receiver to use a double-layer sound play design. In a default (sliding out or lifting is not required), the receiver can sound normally after passing through two layers of sound output holes. Compared with a machine without a sliding cover or raising and falling, an inner-layer sound output channel is added in this design. When a user uses the front-facing camera, a module needs to be slid out or lifted. In this case, the inner-layer sound output channel of the receiver is exposed.

Since an area of an inner-layer receiver sound output hole is larger than an area of an outer-layer sound output hole, dust can easily enter the receiver through the inner-layer receiver sound output hole. After the receiver is used for a period of time, a certain amount of fine impurity or dust is accumulated in a front cavity of the receiver, and is located attached to a diaphragm, causing a noise problem to the receiver.

For such a problem that fine impurity or dust enter the receiver, it is very difficult to perform maintenance, and cannot be repaired by surface cleaning. Therefore, a receiver unit must be split and cleaned or even replaced. The difficulty and costs of maintenance are greatly increased, a market failure rate is high, product design reliability is poor, and user experience is seriously affected.

SUMMARY

An embodiment of the present disclosure discloses a mobile terminal, including:

a first terminal portion disposed with a first sound output hole; and a second terminal portion on which a receiver is disposed, where a second sound output hole is disposed on the second terminal portion, and the second terminal portion can move between a first position and a second position relative to the first terminal portion; where at the first position, the first sound output hole is connected to the second sound output hole, and at the second position, the second sound output hole is staggered from the first terminal portion; where a movable baffle is disposed on the second terminal portion, where the second terminal portion is located at the second position relative to the first terminal portion, and the baffle covers the second sound output hole; the second terminal portion is located at the first position relative to the first terminal portion, the baffle is removed away from the second sound output hole, and the first sound output hole is connected to the second sound output hole.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DESCRIPTION OF EMBODIMENTS

Figure 1:
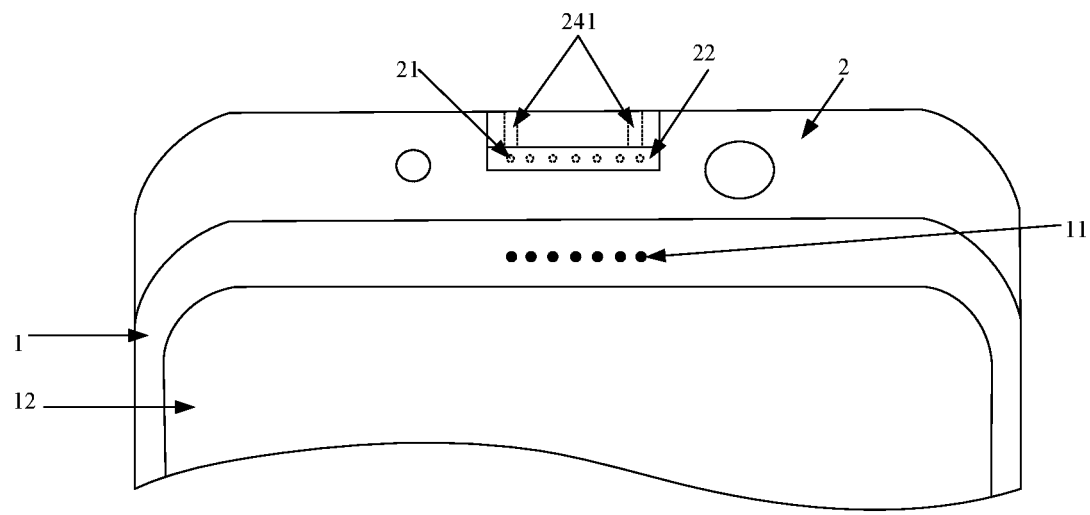
FIG. 1 is a first schematic structural diagram of a mobile terminal according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art shall fall within the protection scope of the present disclosure.

As shown in FIG. 1 to FIG. 6, an embodiment of the present disclosure provides a terminal, including:

a first terminal portion 1 disposed with a first sound output hole 11; and a second terminal portion 2 on which a receiver 3 is disposed, where a second sound output hole 21 is disposed on the second terminal portion 2, the second sound output hole 21 is connected to the receiver 3, and the second terminal portion 21 can move between a first position and a second position relative to the first terminal portion 1; where at the first position, the first sound output hole 11 is connected to the second sound output hole 21, and at the second position, the second sound output hole 21 is staggered from the first terminal portion 1; where a movable baffle 22 is disposed on the second terminal portion 2, where the second terminal portion 2 is located at the second position relative to the first terminal portion 1, and the baffle 22 covers the second sound output hole 21; the second terminal portion 2 is located at the first position relative to the first terminal portion 1, the baffle 22 is removed away from the second sound output hole 21, and the first sound output hole 11 is connected to the second sound output hole 21.

An aperture of the first sound output hole 11 is less than an aperture of the second sound output hole 21, to prevent dust from entering the second sound output hole 21 and being attached to a diaphragm of the receiver. The baffle 22 may be a baffle that does not include a sound output hole, or may be a baffle on which a third sound output hole is disposed. When the third sound output hole is disposed on the baffle 22, an aperture of the third sound output hole is less than the aperture of the second sound output hole 21, which can not only implement a dustproof effect, but also ensure that sound output of the receiver 3 is normal.

Optionally, the receiver 3 may further include a receiver body 31 and a receiver diaphragm 32 disposed on the receiver body 31.

In the foregoing embodiment of the present disclosure, by using the movable baffle 22 disposed on the second terminal portion 2, when the second terminal portion 2 is located at the first position relative to the first terminal portion 1, the first sound output hole 11 is connected to the second sound output hole 21, to ensure call quality. When the second terminal portion 2 is located at the second position relative to the first terminal portion 1, the baffle 22 covers the second sound output hole 21, to prevent a problem that the receiver 3 is prone to noise and difficult to clean because fine impurity or dust is accumulated in a front cavity of the receiver 3 and is attached to a diaphragm of the receiver 3.

In an embodiment of the present disclosure, as shown in FIG. 1, the mobile terminal may be a slide-cover terminal. The first terminal portion 1 is installed with a display 12, the second terminal portion 2 is installed with a battery cover, and the first terminal portion 1 is disposed opposite to the second terminal portion 2.

A flash lamp, a receiver, a front-facing camera, and the like may be disposed on a top of the second terminal portion 2, and a position is not limited.

Optionally, a mounting groove 23 is disposed on the second terminal portion 2, a driving element is disposed in the mounting groove 23, and the driving element drives the baffle 22 so that the baffle 22 has a motion trend to cover the second sound output hole 21.

The driving element may be an element that has a driving force, such as an elastic element or a magnetic element.

Optionally, when the driving element is an elastic element 241, the baffle 22 is mounted in the mounting groove 23 by using the elastic element 241.

The elastic element 241 may be a spring, and the spring may be separately connected to a groove bottom of the mounting groove 23 (in other words, the other end opposite to an opening end of the mounting groove 23) and the baffle 22. Alternatively, the spring is only connected to a groove bottom of the mounting groove 23, and is only in contact with the baffle 22. Alternatively, the spring is in contact with both a groove bottom of the mounting groove 23 and the baffle 22. The elastic element 241 is not limited to a spring.

Figure 3:
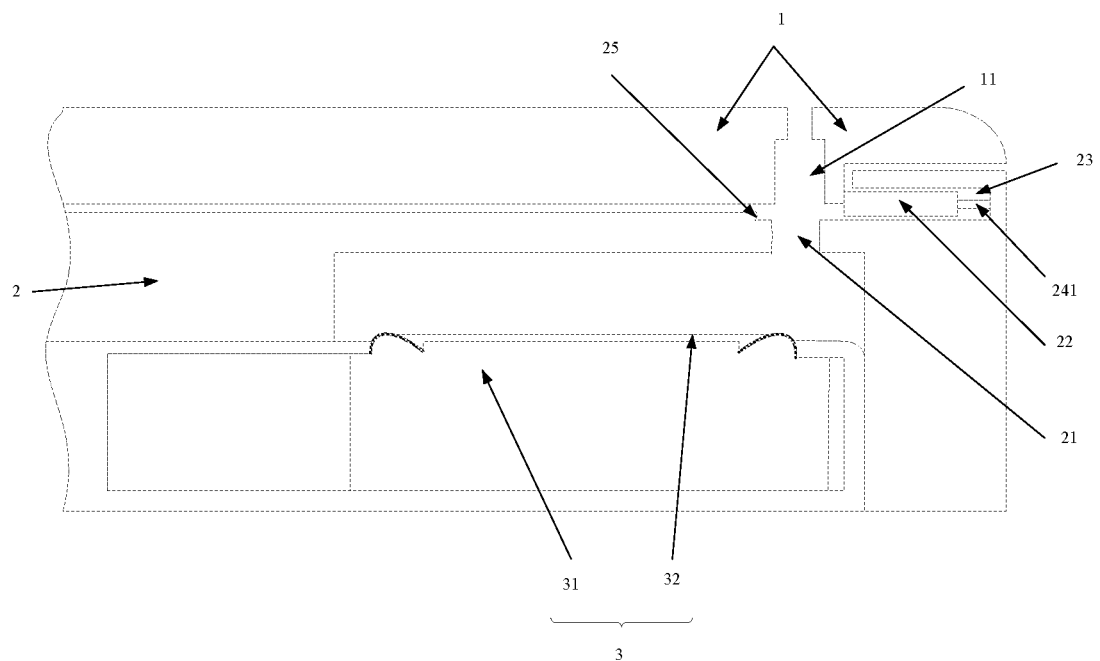
FIG. 3 is a first schematic diagram of a relative position of a damper according to an embodiment of the present disclosure.
Figure 4:
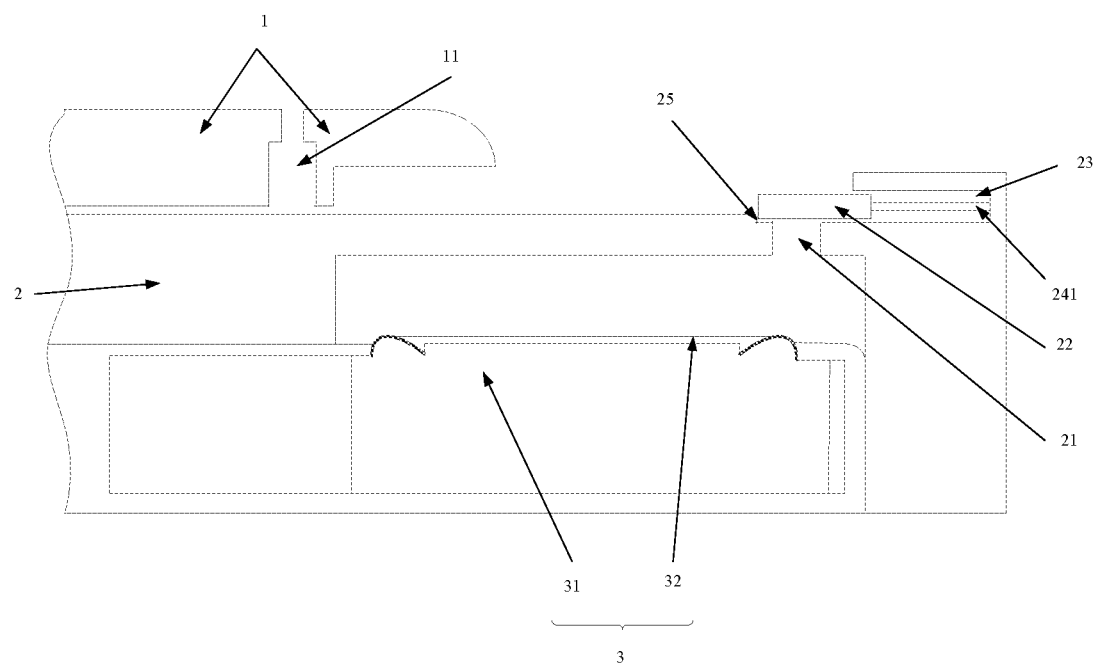
FIG. 4 is a second schematic diagram of a relative position of a damper according to an embodiment of the present disclosure.

Optionally, as shown in FIG. 3, when the second terminal portion 2 is located at the first position relative to the first terminal portion 1, the elastic element 241 is in a compressed state, the baffle 22 is located in the mounting groove 23 and abuts against the first terminal portion 1, and the second sound output hole 21 is disposed on a surface of the baffle 22 away from the elastic element 241; and as shown in FIG. 4, the second terminal portion 2 moves from the first position to the second position relative to the first terminal portion 1, and a portion of the baffle 22 moves out of the mounting groove 23 toward the second sound output hole 21 and covers the second sound output hole 21 under an elastic restoring force of the elastic element 241, to prevent dust from entering the receiver 3 through the second sound output hole 21.

A surface of the baffle 22 away from the elastic element 241 may be exposed outside the mounting groove 23, or may not be exposed outside the mounting groove 23. In other words, the baffle 22 may be partially located in the mounting groove 23, or may be entirely located in the mounting groove 23.

Figure 5:
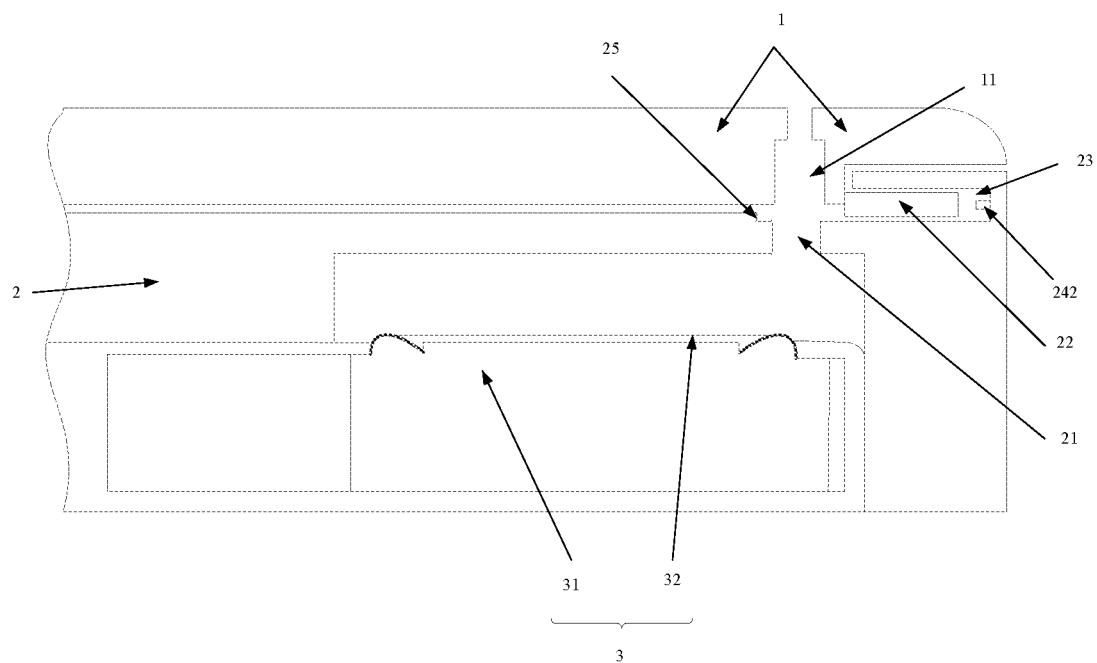
FIG. 5 is a schematic diagram of a position of a driving element according to an embodiment of the present disclosure.

Optionally, as shown in FIG. 5, when the driving element is a first magnetic element 242, a second magnetic element is disposed on the baffle 22, and opposite ends of the first magnetic element 242 and the second magnetic element are like poles (in other words, both are N poles or both are S poles). The first magnetic element 242 and the magnetic pole at the end opposite to the second magnetic element are always repel each other under the action of a magnetic field, to provide the second magnetic element with an action force for moving toward the second sound output hole 21, so that the second magnetic element always has a motion trend to cover the second sound output hole 21. The second magnetic element may be integrated with the baffle 22, in other words, the baffle 22 is a magnetic baffle. The second magnetic element may alternatively be a separate magnetic element, and is fixedly connected to one end of the baffle 22 that is close to the first magnetic element 242.

When the second terminal portion 2 is located at the first position relative to the first terminal portion 1, the baffle 22 is located in the mounting grove 23 and abuts against the first terminal portion 1, and the second sound output hole 21 is disposed on a side of the baffle 22 that is away from the first magnetic element 242. The second terminal portion 2 moves from the first position to the second position relative to the first terminal portion 1. Under the magnetic force between the first magnetic element 242 and the second magnetic element, a portion of the baffle 22 moves out of the mounting groove 23 and covers the second sound output hole 21.

Optionally, an abutment wall 25 is disposed on the second terminal portion 2. When the baffle 22 covers the second sound output hole 21, an end face of the baffle 22 that is away from the driving element abuts against the abutment wall 25; in other words, an end face of the baffle 22 that is away from a groove bottom abuts against the abutment wall 25, to prevent an end of the baffle 22 near the driving element or near the groove bottom from moving out of the mounting groove 23.

Figure 6:
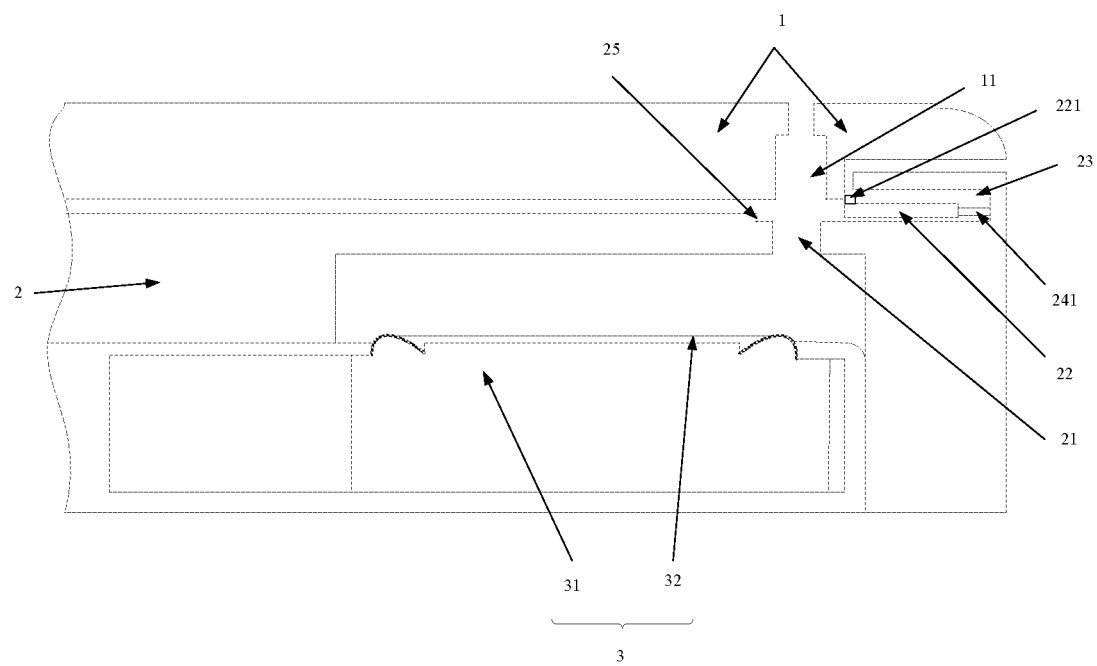
FIG. 6 is a schematic structural diagram of a damper according to an embodiment of the present disclosure.

Optionally, as shown in FIG. 6, a protrusion 221 may be further disposed on the baffle 22, the second terminal portion 2 moves from the second position to the first position relative to the first terminal portion 1, and the first terminal portion 1 pushes the protrusion 221 to drive the baffle 22 to move toward the mounting groove 23.

For example, the driving element is an elastic element 241. The second terminal portion 2 can slide relative to the first terminal portion 1. When the second terminal portion 2 and the first terminal portion 1 are not separated through sliding, the first terminal portion 1 covers the second terminal portion 2, in other words, the first terminal portion 1 is disposed opposite to the second terminal portion 2, and the first sound output hole 11 is opposite to the second sound output hole 21, in other words, the first sound output hole 11 is an outgoing sound output hole, and the second sound output hole 21 is an incoming sound output hole, to ensure that a dual-layer sound output channel of the receiver 3 is normal, and ensure call quality. In this case, the elastic element 241 is in a compressed state, as shown in FIG. 3. When the second terminal portion 2 and the first terminal portion 1 are separated through sliding, the second sound output hole 21 is exposed relative to the first terminal portion 1. In this case, dust easily enters the receiver 3 through the second sound output hole 21. Under the elastic restoring force of the elastic element 241, a portion of the baffle 22 moves out of the mounting groove 23 and moves toward the second sound output hole 21, to cover the second sound output hole 21, as shown in FIG. 4. In this way, dust is prevented from entering the receiver 3 through the second sound output hole 21 and being attached to the receiver diaphragm 32, to avoid causing noise of the receiver 3. A structure of the receiver 3 is not limited.

Figure 2:
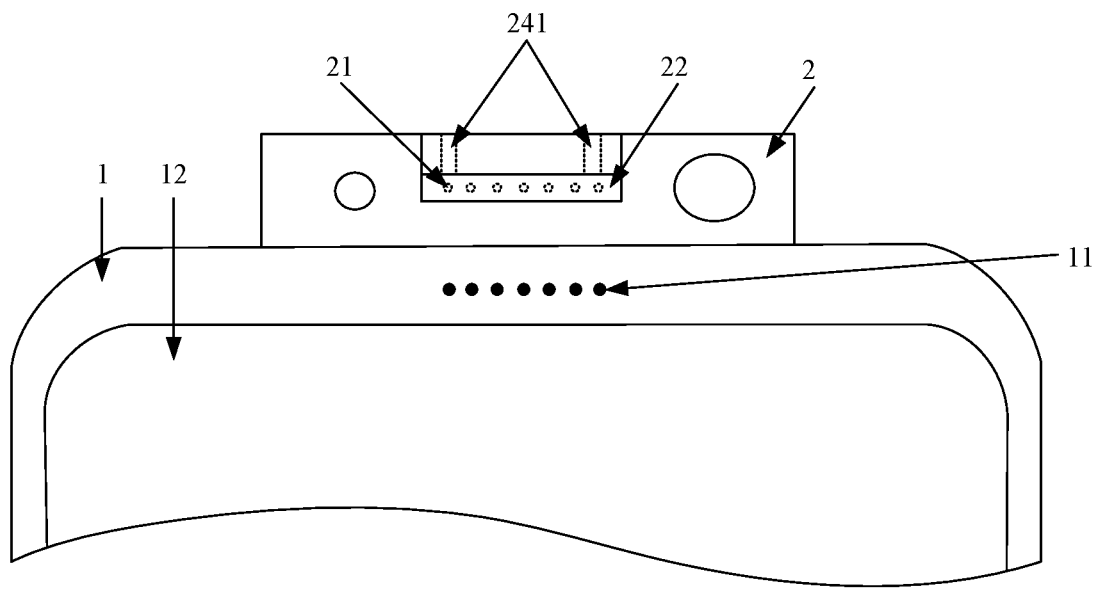
FIG. 2 is a second schematic structural diagram of a mobile terminal according to an embodiment of the present disclosure.

In another embodiment of the present disclosure, as shown in FIG. 2, the mobile terminal may be a terminal including a lifting module. The first terminal portion 1 includes a front housing and a rear housing, the front housing and the rear housing cooperate to form an accommodation space, and the accommodation space has an opening. The second terminal portion 2 moves between the accommodating space and an outer side of the first terminal portion 1 by using the opening.

The second terminal portion 2 is a lifting structure, and may include components such as a flash lamp, a receiver, and a front-facing camera. A position is not limited, and lifting and lowering of the second terminal portion 2 may be controlled by using a driving component (for example, a motor).

Optionally, a mounting groove 23 is disposed on the second terminal portion 2, a driving element is disposed in the mounting groove 23, and the driving element drives the baffle 22 so that the baffle 22 has a motion trend to cover the second sound output hole 21.

The driving element may be an element that has a driving force, such as an elastic element or a magnetic element.

Optionally, when the driving element is an elastic element 241, the baffle 22 is mounted in the mounting groove 23 by using the elastic element 241.

The elastic element 241 may be a spring, and the spring may be separately connected to a groove bottom of the mounting groove 23 (in other words, the other end opposite to an opening end of the mounting groove 23) and the baffle 22. Alternatively, the spring is only connected to a groove bottom of the mounting groove 23, and is only in contact with the baffle 22. Alternatively, the spring is in contact with both a groove bottom of the mounting groove 23 and the baffle 22. The elastic element 241 is not limited to a spring.

Optionally, when the second terminal portion 2 is located at the first position relative to the first terminal portion 1, the elastic element 241 is in a compressed state, the baffle 22 is located in the mounting groove 23 and abuts against the first terminal portion 1, and the second sound output hole 21 is disposed on a surface of the baffle 22 away from the elastic element 241; and the second terminal portion 2 moves from the first position to the second position relative to the first terminal portion 1, and a portion of the baffle 22 moves out of the mounting groove 23 toward the second sound output hole 21 and covers the second sound output hole 21 under an elastic restoring force of the elastic element 241, to prevent dust from entering the receiver 3 through the second sound output hole 21.

A surface of the baffle 22 away from the elastic element 241 may be exposed outside the mounting groove 23, or may not be exposed outside the mounting groove 23. In other words, the baffle 22 may be partially located in the mounting groove 23, or may be entirely located in the mounting groove 23.

Optionally, when the driving element is a first magnetic element 242, a second magnetic element is disposed on the baffle 22, and opposite ends of the first magnetic element 242 and the second magnetic element are like poles. The first magnetic element 242 and the magnetic pole at the end opposite to the second magnetic element are always mutually rejected under the action of a magnetic field, to provide the second magnetic element with an action force for moving toward the second sound output hole 21, so that the second magnetic element always has a motion trend to cover the second sound output hole 21. The second magnetic element may be integrated with the baffle 22, in other words, the baffle 22 is a magnetic baffle. The second magnetic element may alternatively be a separate magnetic element, and is fixedly connected to one end of the baffle 22 that is close to the first magnetic element 242.

When the second terminal portion 2 is located at the first position relative to the first terminal portion 1, the baffle 22 is located in the mounting grove 23 and abuts against the first terminal portion 1, and the second sound output hole 21 is disposed on a side of the baffle 22 that is away from the first magnetic element 242. The second terminal portion 2 moves from the first position to the second position relative to the first terminal portion 1. Under the magnetic force between the first magnetic element 242 and the second magnetic element, a portion of the baffle 22 moves out of the mounting groove 23 and covers the second sound output hole 21.

Optionally, an abutment wall 25 is disposed on the second terminal portion 2. When the baffle 22 covers the second sound output hole 21, an end face of the baffle 22 that is away from the driving element abuts against the abutment wall 25; in other words, an end face of the baffle 22 that is away from a groove bottom abuts against the abutment wall 25, to prevent an end of the baffle 22 near the driving element or near the groove bottom from moving out of the mounting groove 23.

Optionally, a protrusion 221 may be further disposed on the baffle 22, the second terminal portion 2 moves from the second position to the first position relative to the first terminal portion 1, and the first terminal portion 1 pushes the protrusion 221 to drive the baffle 22 to move toward the mounting groove 23.

For example, the driving element is an elastic element 241. When the second terminal portion 2 is disposed in the accommodation space, the first sound output hole 11 is opposite to the second sound output hole 21, in other words, the first sound output hole 11 is an outgoing sound output hole, and the second sound output hole 21 is an incoming sound output hole, to ensure that a dual-layer sound output channel of the receiver 3 is normal, and ensure call quality. In this case, the elastic element 241 is in a compressed state. When the second terminal portion 2 is lifted relative to the first terminal portion 1 (in other words, moves out of the opening to an outer side of the second terminal portion 1), the second sound output hole 21 is exposed relative to the first terminal portion 1. In this case, dust easily enters the receiver 3 through the second sound output hole 21. Under the elastic restoring force of the elastic element 241, a portion of the baffle 22 moves out of the mounting groove 23 and moves toward the second sound output hole 21, to cover the second sound output hole 21. In this way, dust is prevented from entering the receiver 3 through the second sound output hole 21 and being attached to the receiver diaphragm 32, to avoid causing noise of the receiver 3. A structure of the receiver 3 is not limited.

For ease of description, the mobile phone may be used as an instance of the terminal device in the present disclosure. A person skilled in the art may understand that, in addition to using the mobile phone as the terminal device, another terminal device that has a display screen may also be used, such as a tablet computer, an e-book reader, a moving picture experts group audio layer III (MP3) player, a moving picture experts group audio layer IV (MP4) player, a laptop computer, a vehicle-mounted computer, a desktop computer, a set top box, a smart television, and a wearable device that are all within the protection scope of the embodiments of the present disclosure.

In the foregoing embodiment of the present disclosure, by using the movable baffle 22 disposed on the second terminal portion 2, when the second terminal portion 2 is located at the first position relative to the first terminal portion 1, the first sound output hole 11 is connected to the second sound output hole 21, to ensure call quality. When the second terminal portion 2 is located at the second position relative to the first terminal portion 1, the baffle 22 covers the second sound output hole 21, to prevent a problem that the receiver 3 is prone to noise and difficult to clean because fine impurity or dust is accumulated in a front cavity of the receiver 3 and is attached to a diaphragm of the receiver 3, so that product reliability can be improved, a failure rate of the receiver 3 is reduced, and user experience is improved.

The embodiments in this specification are described in a progressive manner. Each embodiment focuses on a difference from another embodiment, and for a same or similar part of the embodiments, reference may be made to each other.

Although an optional embodiment of the embodiments of the present disclosure has been described, persons skilled in the art may make other changes and modifications to these embodiments once they learn the basic creative concept. Therefore, the appended claims are intended to be construed as including alternative embodiments and all changes and modifications falling within the scope of the embodiments of this disclosure.

Finally, it should be further noted that in this specification, relationship terms such as "first" and "second" are merely used to distinguish one entity or operation from another entity or operation, and do not necessarily require or imply that any such actual relationship or sequence exists between these entities or operations. In addition, the term "include", "including", or any other variant is intended to cover non-exclusive inclusion, so that a process, method, article, or terminal device that includes a series of elements includes not only those elements but also other elements that are not explicitly listed, or includes elements inherent to such a process, method, article, or terminal device. In the absence of more restrictions, an element defined by the statement "including a . . . " does not exclude another same element in a process, method, article, or terminal device that includes the element.

The foregoing description is an optional implementation of the present disclosure. It should be noted that, for a person of ordinary skill in the art, improvements and ornaments may be made without departing from the principles of the present disclosure. The improvements and ornaments are also within the protection scope of the present disclosure.

What is claimed is:

1. A mobile terminal, comprising:
a first terminal portion disposed with a first sound output hole; and
a second terminal portion on which a receiver is disposed, wherein a second sound output hole is disposed on the second terminal portion, and the second terminal portion can move between a first position and a second position relative to the first terminal portion; wherein at the first position, the first sound output hole is connected to the second sound output hole, and at the second position, the second sound output hole is staggered from the first terminal portion;
wherein a movable baffle is disposed on the second terminal portion, wherein the second terminal portion is located at the second position relative to the first terminal portion, and the baffle covers the second sound output hole; the second terminal portion is located at the first position relative to the first terminal portion, the baffle is removed away from the second sound output hole, and the first sound output hole is connected to the second sound output hole;
wherein a mounting groove is disposed on the second terminal portion, a driving element is disposed in the mounting groove, and the driving element drives the baffle so that the baffle has a motion trend to cover the second sound output hole.

2. The mobile terminal according to claim 1, wherein the driving element is an elastic element, and the baffle is mounted in the mounting groove by using the elastic element.

3. The mobile terminal according to claim 2, wherein when the second terminal portion is located at the first position relative to the first terminal portion, the elastic element is in a compressed state, the baffle is located in the mounting groove and abuts against the first terminal portion, and the second sound output hole is disposed on a surface of the baffle away from the elastic element; and the second terminal portion moves from the first position to the second position relative to the first terminal portion, and a portion of the baffle moves out of the mounting groove and covers the second sound output hole under an elastic restoring force of the elastic element.

4. The mobile terminal according to claim 3, wherein a display screen is installed on the first terminal portion, a battery cover is installed on the second terminal portion, and the first terminal portion is disposed opposite to the second terminal portion.

5. The mobile terminal according to claim 2, wherein a display screen is installed on the first terminal portion, a battery cover is installed on the second terminal portion, and the first terminal portion is disposed opposite to the second terminal portion.

6. The mobile terminal according to claim 2, wherein the first terminal portion comprises a front housing and a rear housing, the front housing and the rear housing cooperate to form an accommodation space, and the accommodation space has an opening; and
the second terminal portion moves between the accommodation space and an outer side of the first terminal portion by using the opening.

7. The mobile terminal according to claim 1, wherein the driving element is a first magnetic element, a second magnetic element is disposed on the baffle, and opposite ends of the first magnetic element and the second magnetic element are like poles.

8. The mobile terminal according to claim 7, wherein a display screen is installed on the first terminal portion, a battery cover is installed on the second terminal portion, and the first terminal portion is disposed opposite to the second terminal portion.

9. The mobile terminal according to claim 7, wherein the first terminal portion comprises a front housing and a rear housing, the front housing and the rear housing cooperate to form an accommodation space, and the accommodation space has an opening; and the second terminal portion moves between the accommodation space and an outer side of the first terminal portion by using the opening.

10. The mobile terminal according to claim 1, wherein an abutment wall is disposed on the second terminal portion, and when the baffle covers the second sound output hole, a surface of the baffle away from the driving element abuts against the abutment wall.

11. The mobile terminal according to claim 10, wherein a display screen is installed on the first terminal portion, a battery cover is installed on the second terminal portion, and the first terminal portion is disposed opposite to the second terminal portion.

12. The mobile terminal according to claim 10, wherein the first terminal portion comprises a front housing and a rear housing, the front housing and the rear housing cooperate to form an accommodation space, and the accommodation space has an opening; and the second terminal portion moves between the accommodation space and an outer side of the first terminal portion by using the opening.

13. The mobile terminal according to claim 1, wherein a protrusion is disposed on the baffle, the second terminal portion moves from the second position to the first position relative to the first terminal portion, and the first terminal portion pushes the protrusion to drive the baffle to move toward the mounting groove.

14. The mobile terminal according to claim 13, wherein a display screen is installed on the first terminal portion, a battery cover is installed on the second terminal portion, and the first terminal portion is disposed opposite to the second terminal portion.

15. The mobile terminal according to claim 1, wherein a display screen is installed on the first terminal portion, a battery cover is installed on the second terminal portion, and the first terminal portion is disposed opposite to the second terminal portion.

16. The mobile terminal according to claim 1, wherein the first terminal portion comprises a front housing and a rear housing, the front housing and the rear housing cooperate to form an accommodation space, and the accommodation space has an opening; and the second terminal portion moves between the accommodation space and an outer side of the first terminal portion by using the opening.

17. The mobile terminal according to claim 1, wherein the mobile terminal comprises at least one of a mobile phone, a tablet computer, an e-book reader, an MP3 player, an MP4 player, a laptop computer, a vehicle-mounted computer, a desktop computer, a set top box, a smart television, or a wearable device.

18. The mobile terminal according to claim 1, wherein an aperture of the first sound output hole is less than an aperture of the second sound output hole.

\* \* \* \* \*